United States Patent
Kozłowski et al.

(10) Patent No.: US 10,821,563 B2
(45) Date of Patent: Nov. 3, 2020

(54) NOZZLE ASSEMBLY

(71) Applicant: Hamilton Sundstrand Corporation, Charlotte, NC (US)

(72) Inventors: Piotr Kozłowski, Mielec (PL); Piotr Sawicki, Bogdaniec (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 133 days.

(21) Appl. No.: 16/117,055

(22) Filed: Aug. 30, 2018

(65) Prior Publication Data

US 2019/0118315 A1    Apr. 25, 2019

(30) Foreign Application Priority Data

Oct. 19, 2017   (EP) .................................... 17461622

(51) Int. Cl.
| | |
|---|---|
| B23P 15/00 | (2006.01) |
| F15B 13/043 | (2006.01) |
| F16K 51/00 | (2006.01) |
| F15B 21/041 | (2019.01) |

(52) U.S. Cl.
CPC ........ B23P 15/001 (2013.01); F15B 13/0438 (2013.01); F16K 51/00 (2013.01); F15B 21/041 (2013.01)

(58) Field of Classification Search
CPC .. B23P 15/001; F15B 13/0438; F15B 21/041; F16K 51/00
See application file for complete search history.

(56) References Cited

U.S. PATENT DOCUMENTS

| | | | | |
|---|---|---|---|---|
| 2,832,318 | A | * | 4/1958 | Paine ........................ F15B 9/17 137/625.62 |
| 2,934,765 | A | | 4/1960 | Carson |
| 3,029,830 | A | | 4/1962 | Klover et al. |
| 3,065,145 | A | | 11/1962 | Molander, Jr. et al. |
| 3,245,424 | A | * | 4/1966 | Olsen .................. F15B 13/0438 137/85 |
| 3,584,649 | A | * | 6/1971 | Cobb .................. F15B 13/0436 137/625.61 |
| 3,874,405 | A | | 4/1975 | Thayer |
| 4,352,367 | A | * | 10/1982 | Pollman .................... F15C 3/14 137/316 |
| 4,378,031 | A | * | 3/1983 | Nicholson ........... F15B 13/0436 137/625.63 |

(Continued)

FOREIGN PATENT DOCUMENTS

| | | |
|---|---|---|
| CN | 2042903 U | 8/1989 |
| GB | 845109 A | 8/1960 |

(Continued)

OTHER PUBLICATIONS

Extended European Search Report for International Application No. 17461622.7 dated May 4, 2018, 7 pages.

*Primary Examiner* — Kenneth Rinehart
*Assistant Examiner* — Patrick C Williams
(74) *Attorney, Agent, or Firm* — Cantor Colburn LLP

(57) ABSTRACT

The present disclosure relates to a nozzle assembly for a servo valve. The nozzle assembly comprises a nozzle including a nozzle inlet and a nozzle outlet, and a tubular filter mounted to the nozzle for filtering fluid flowing into the nozzle through the nozzle inlet.

10 Claims, 7 Drawing Sheets

(56) References Cited

U.S. PATENT DOCUMENTS

| 4,592,381 A | * | 6/1986 | Troy | F16T 1/34 |
|---|---|---|---|---|
| | | | | 137/203 |
| 6,648,014 B1 | | 11/2003 | Takahashi et al. | |
| 6,843,729 B2 | * | 1/2005 | Hughes | B25B 15/005 |
| | | | | 470/11 |
| 2014/0027364 A1 | * | 1/2014 | Vale | B01D 35/06 |
| | | | | 210/223 |
| 2017/0232563 A1 | * | 8/2017 | Sawicki | F15B 19/002 |
| | | | | 29/446 |

FOREIGN PATENT DOCUMENTS

| GB | 1147204 A | * | 4/1969 | F15B 13/0438 |
|---|---|---|---|---|
| RU | 2241143 C1 | | 11/2004 | |

\* cited by examiner

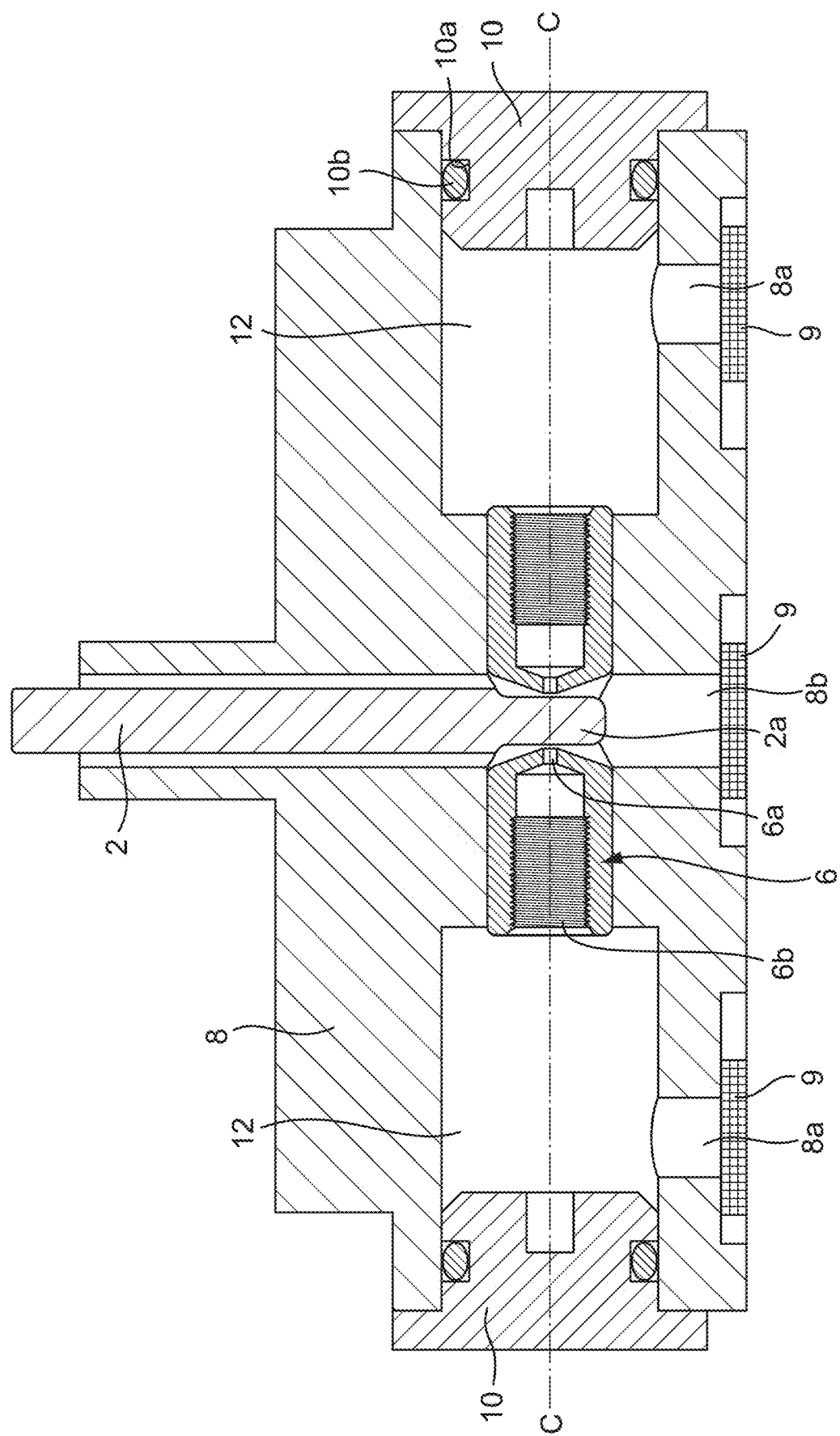

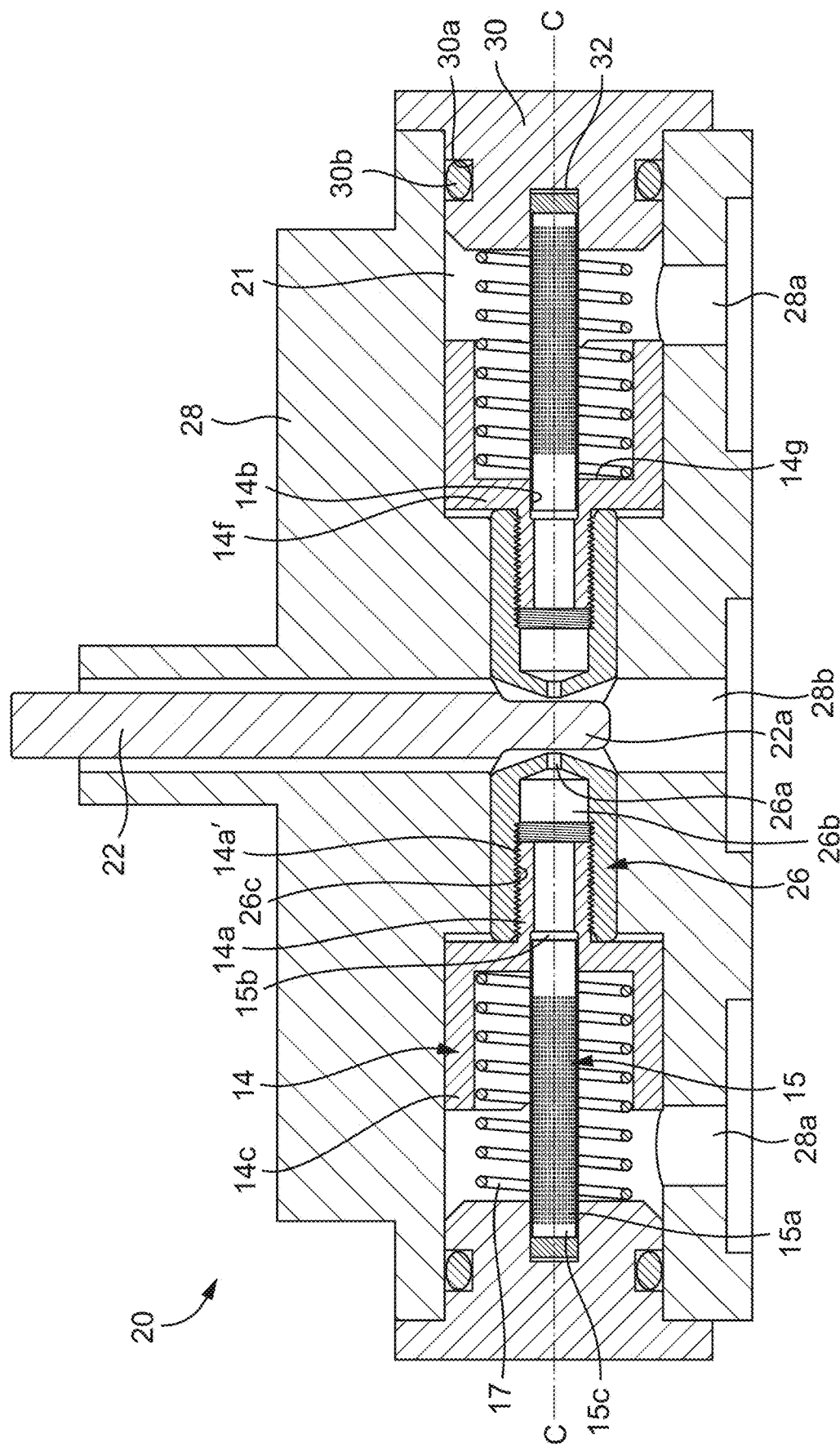

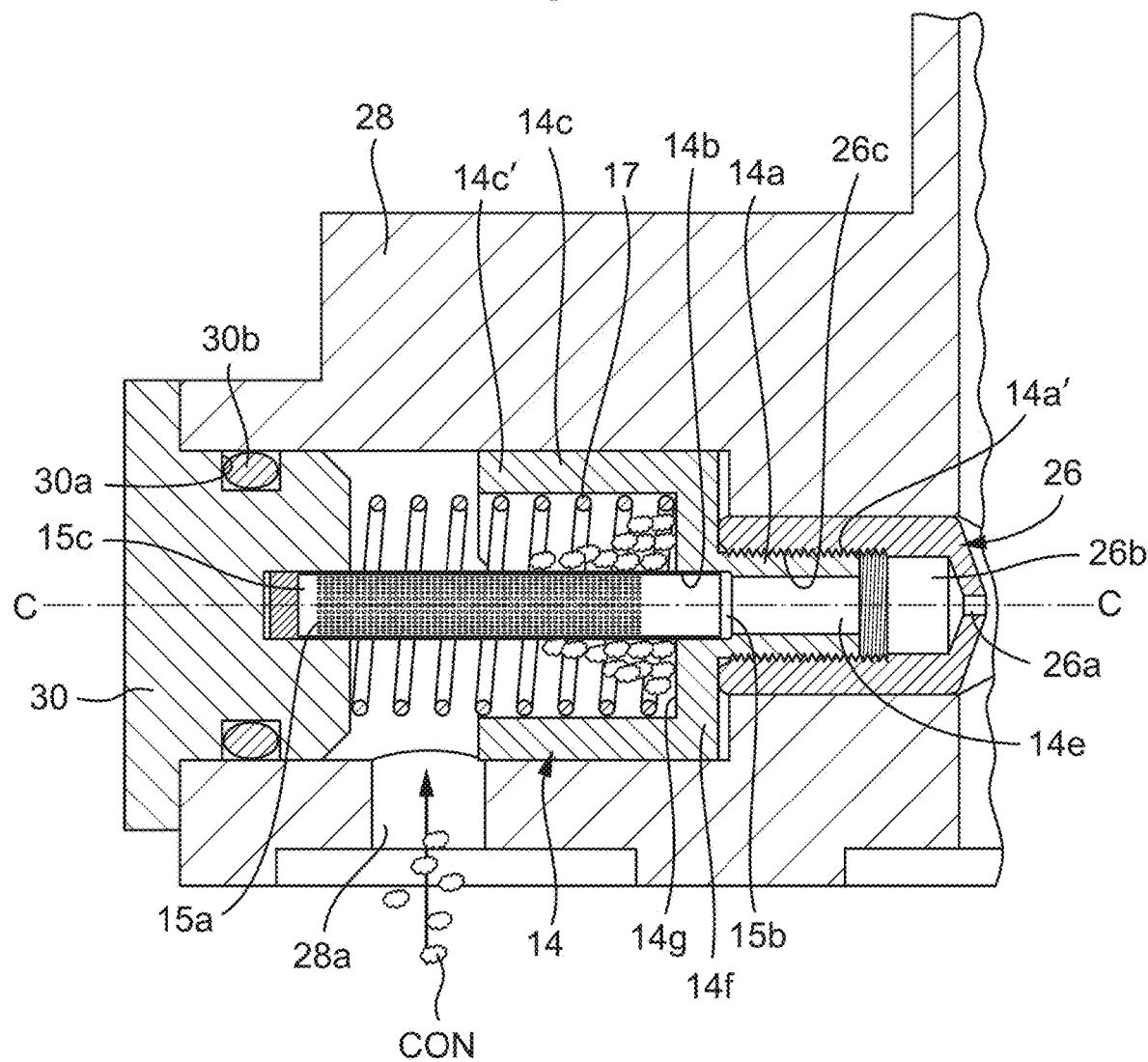

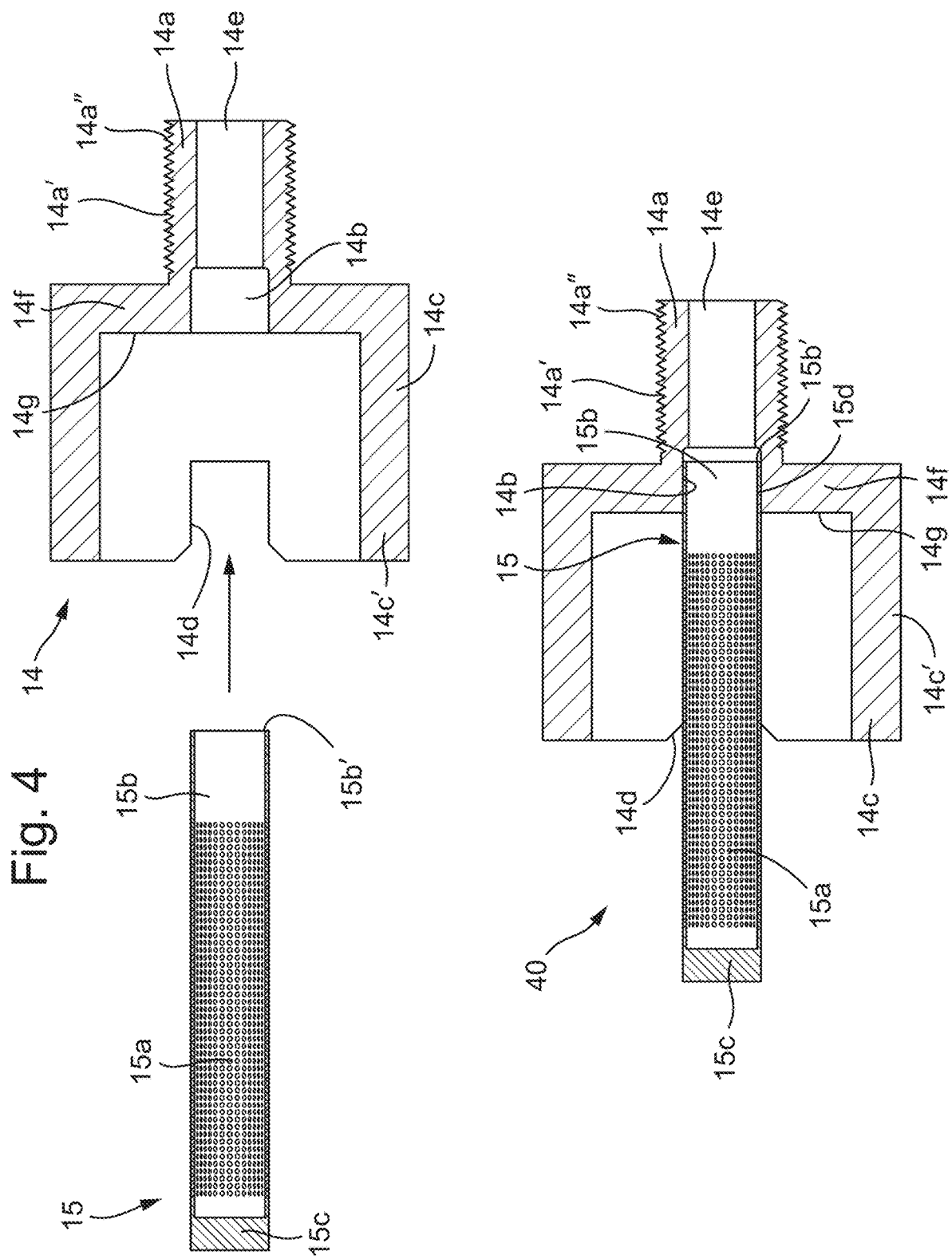

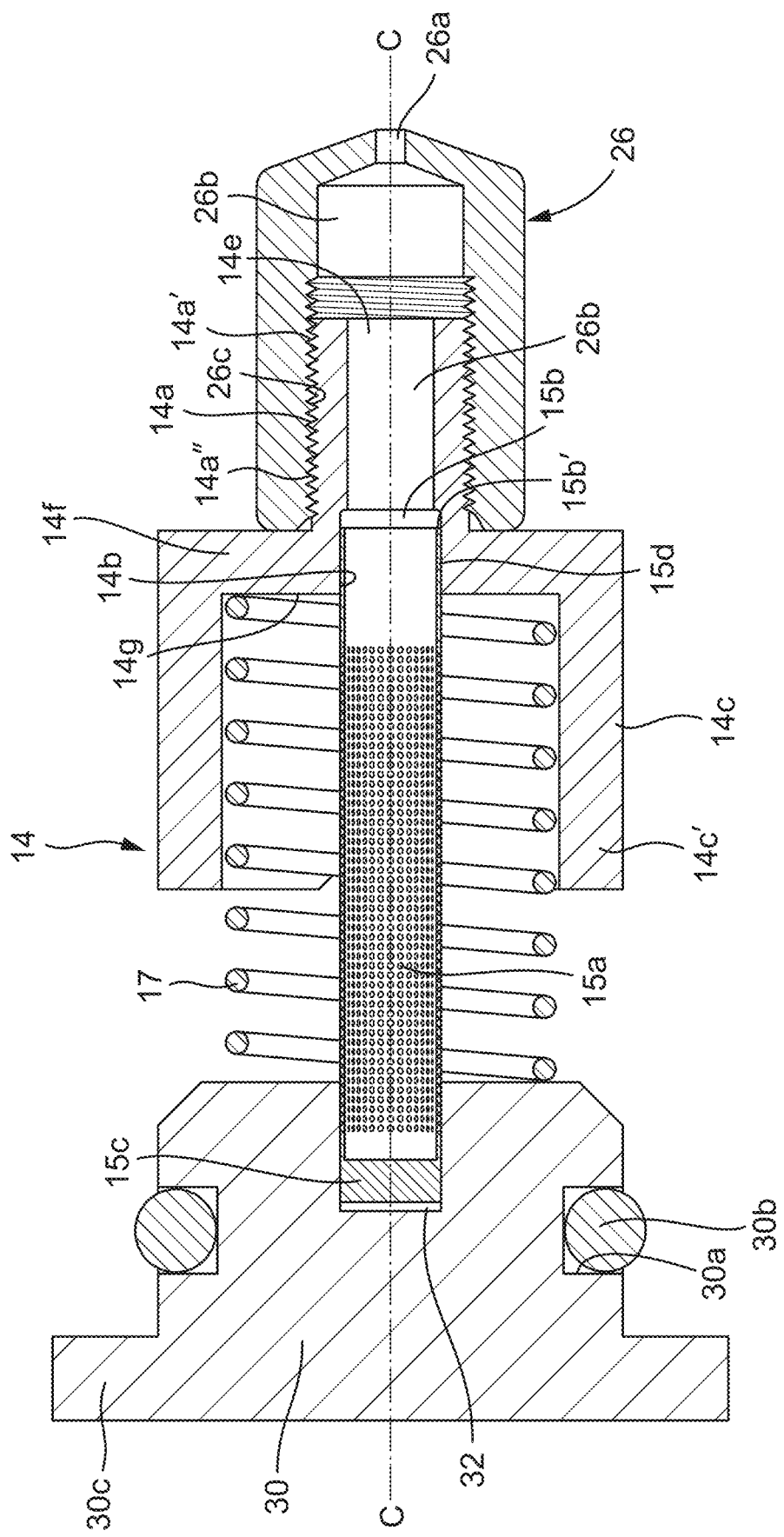

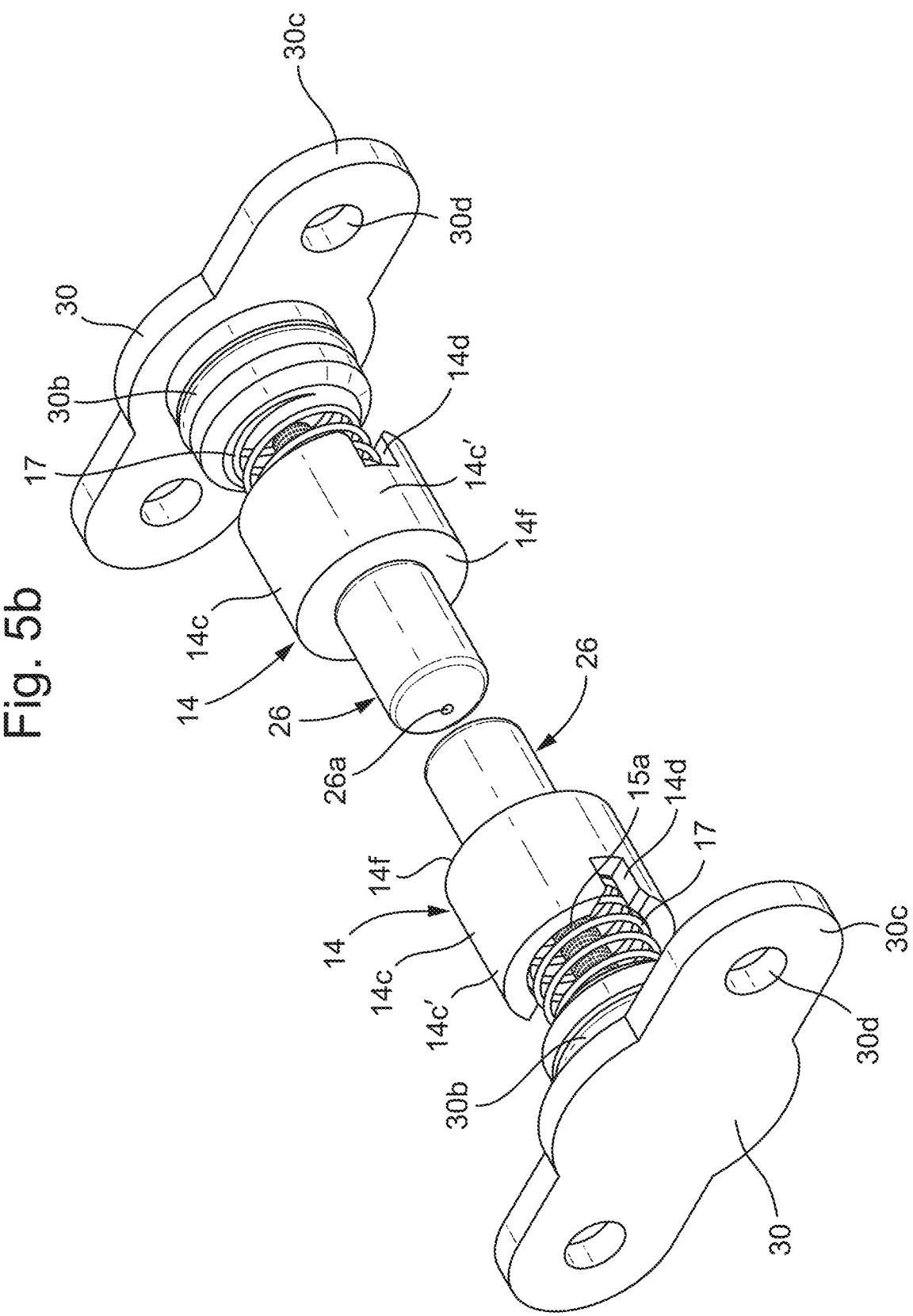

NOZZLE ASSEMBLY

FOREIGN PRIORITY

This application claims priority to European Patent Application No. 17461622.7 filed Oct. 19, 2017, the entire contents of which is incorporated herein by reference.

TECHNICAL FIELD

This disclosure relates to a nozzle assembly, and more specifically, but not exclusively, to a nozzle assembly of a servo valve.

This disclosure also relates to a tubular filter for a nozzle assembly of a servovalve and a method of assembling a servovalve assembly.

BACKGROUND

Servo valves are well-known in the art and can be used to control how much fluid is ported to an actuator. Typically, in a servo valve, a flapper is deflected by an armature connected to an electric motor away or towards nozzles, which inject the fluid. Deflection of the flapper can control the amount of fluid injected from the nozzles, and thus the amount of fluid communicated to the actuator downstream of the nozzles. In this way, servo valves can allow precise control of actuator movement. Calibration of the servo valve is often required to ensure the correct control of actuator movement is realised, and is achieved by adjusting the axial distance from the nozzle outlet to the flapper.

During use, contaminants from the fluid passing through the servo valve can cause blockages, which can prevent accurate operation of the servo valve. Once contaminants have formed such a blockage, the servo valve must be disassembled and cleaned to remove it, or, as is often more convenient for time purposes, replaced altogether. To reduce the frequency of such blockages, servo valves may be provided with particulate filters, to filter out contaminants from the fluid passing through the servo valve. Prior art examples of a servo valve with contaminant filters are shown in U.S. Pat. No. 6,648,014 and FIG. 2. As shown in these prior art examples, a filter is provided between the fluid supply and a fluid port that directs the fluid through the servo valve. Despite being effective at reducing the frequency and severity of blockages, these filters will still become clogged with contaminants after sustained used, and will require removal and cleaning/replacement.

SUMMARY

From one aspect, the present disclosure relates to a nozzle assembly for a servo valve. The nozzle assembly comprises a nozzle including a nozzle inlet and a nozzle outlet, and a tubular filter mounted to the nozzle for filtering fluid flowing into the nozzle through the nozzle inlet.

In an embodiment of the above aspect, the tubular filter comprises a tubular filter body and a nozzle fitting adapter. A first end of the filter body is fixed to the nozzle fitting adapter and a portion of the nozzle fitting adapter is received by a portion of the nozzle at the nozzle inlet. In additional embodiments, the portions of the nozzle fitting adapter and the nozzle inlet may be complementary threaded portions. In additional embodiments, the nozzle fitting adapter may comprise a plurality of slots therein configured to receive a torque tool. In alternative or further additional embodiments, the first end of the filter body is fixed to the nozzle fitting adapter by one or more of an interference fit, weld or braze.

In a further embodiment of the above aspect and embodiments, the nozzle assembly further comprises a housing including a nozzle cavity, and a cap receiving a second, opposing end of the filter body. The nozzle is received in the nozzle cavity and a removable seal is provided between the environment and the nozzle cavity. In additional embodiments, the cap may further comprise an annular recess and an O-ring received in the recess. In alternative or further additional embodiments, the cap may be secured to the housing with removable fasteners or via a screw thread on an outer surface of the cap co-operating with a screw thread on the housing. In yet further alternative or additional embodiments, the nozzle assembly further comprises a spring member extending between the cap and the nozzle fitting adapter. The spring member surrounds the filter body and allows fluid communication thereto.

In yet a further embodiment of the above, the nozzle assembly further comprises a control fluid port opening into the nozzle cavity and in fluid communication with the nozzle via the tubular filter, a flapper arm mounted opposite to the nozzle outlet, and an electric motor configured to control the distance between the flapper arm relative to the nozzle outlet.

In yet a further embodiment of the above aspect and embodiments, the tubular filter comprises a mesh configured to provide an absolute filtration of around 0.1 mm.

From another aspect, the present disclosure relates to a tubular filter for a nozzle assembly of a servo valve. The tubular filter comprises a tubular filter body, and a nozzle fitting adapter. A first end of the filter body is fixed to the nozzle fitting adapter and a portion of the nozzle fitting adapter is threaded.

In an embodiment of the above aspect, the nozzle fitting adapter comprises a plurality of slots therein configured to receive a torque tool.

In a further embodiment of the above aspect and embodiment, the first end of the filter body is fixed to the nozzle fitting adapter by one or more of an interference fit, weld or braze.

In yet a further embodiment of the above aspect and embodiments, the tubular filter comprises a mesh configured to provide an absolute filtration of around 0.1 mm.

From yet another aspect, the present disclosure relates to a method of assembling a servo valve assembly. The method comprises the steps of: providing a housing including a nozzle cavity having a central longitudinal axis, placing a nozzle having a nozzle inlet and a nozzle outlet in the nozzle cavity, calibrating the nozzle by moving the nozzle in a direction parallel to the longitudinal axis, and mounting a tubular filter to the nozzle for filtering fluid flowing into the nozzle through the nozzle inlet.

In an embodiment of the above aspect, the tubular filter comprises a tubular filter body and a nozzle fitting adapter. A first end of the filter body is fixed to the nozzle fitting adapter and the step of mounting the tubular filter to the nozzle further comprises mounting a portion of the nozzle fitting adapter to a portion of the nozzle at the nozzle inlet.

In a further embodiment of the above, the portion of the nozzle fitting adapter is threaded and the step of mounting the tubular filter to the nozzle further comprises threadably engaging the threaded portion of the nozzle fitting adapter to the nozzle at the nozzle inlet.

BRIEF DESCRIPTION OF DRAWINGS

Some exemplary embodiments of the present disclosure will now be described by way of example only, and with reference to the following drawings in which:

FIG. 2 shows another example of a prior art servo valve with contaminant filters;

FIG. 3a shows a cross-sectional view of an embodiment of a nozzle assembly of a stage 1 servo valve assembly in accordance with this disclosure;

FIG. 3b shows a portion of the embodiment of FIG. 3a showing accumulation of contaminant particles in the nozzle assembly;

FIG. 4 shows a cross-sectional view of the tubular filter in both an exploded and assembled state; and FIG. 5a shows an enlarged cross-sectional view of part of the nozzle assembly of FIG. 3a;

FIG. 5b shows a perspective view of the part shown in FIG. 5b.

DETAILED DESCRIPTION

Figure 1:
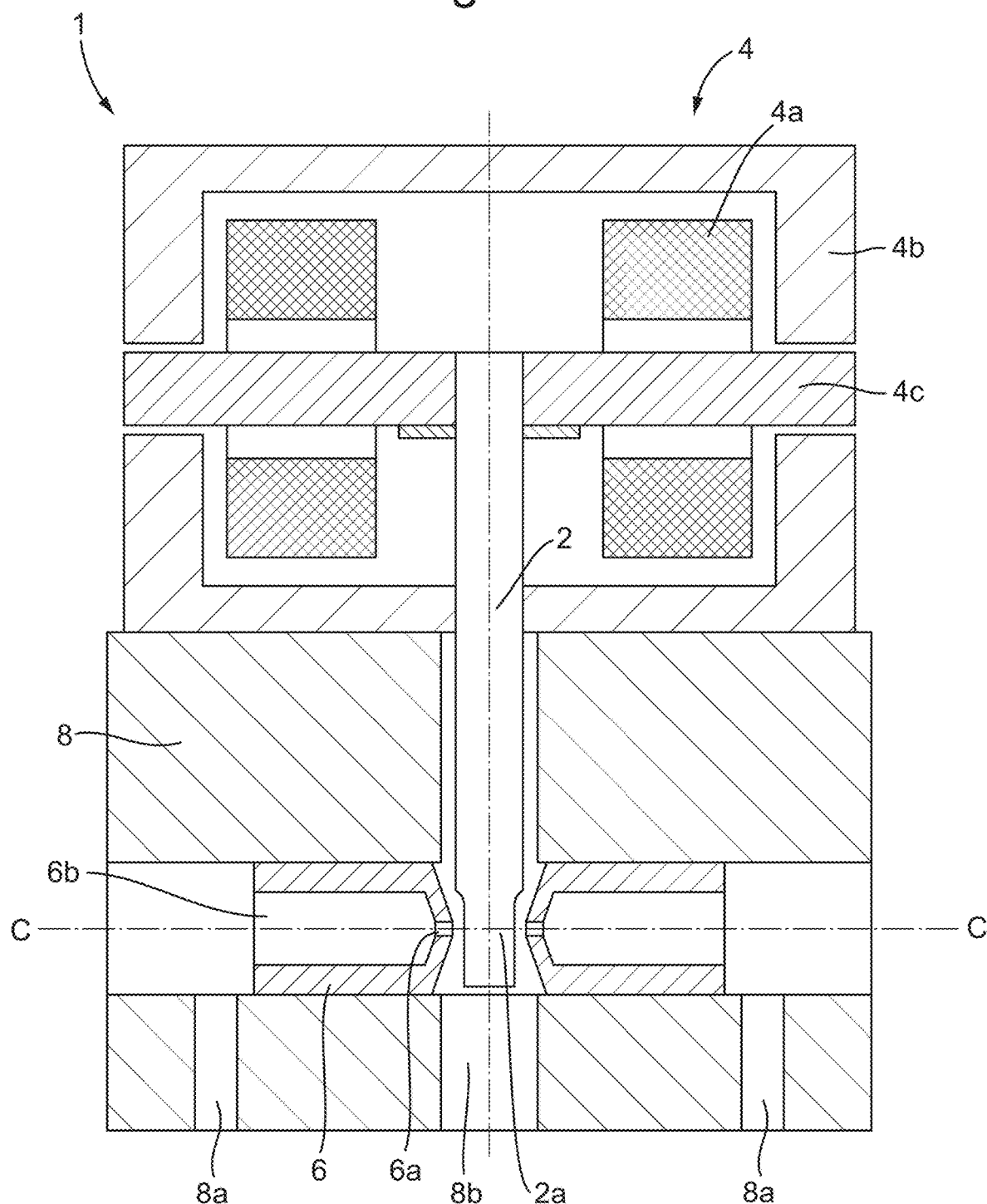
FIG. 1 shows an example of a prior art servo valve.

With reference to FIG. 1, a servo valve 1 is illustrated. Servo valve 1 comprises an electric motor 4, a flapper 2, axially aligned, opposed nozzles 6 and a nozzle housing 8. The electric motor 4 comprises coils 4a, permanent magnets 4b and an armature 4c. The coils 4a are in electrical communication with an electrical supply (not shown) and when activated, interact with the permanent magnets 4b to create movement of the armature 4c, as is well-known in the art.

The flapper 2 is attached to the armature 4c, and is deflected by movement of the armature 4c. The nozzles 6 are housed within nozzle cavities within the nozzle housing 8 via an interference fit and each comprises a fluid outlet 6a and a fluid inlet 6b. The nozzle housing 8 also has a pair of ports 8a, which allow communication of fluid to the nozzles 6 from a fluid supply (not shown).

The flapper 2 comprises a blocking element 2a at an end thereof which interacts with the fluid outlets 6a of the nozzles 6 to provide metering of fluid from the fluid outlets 6a to a fluid port 8b in the nozzle housing 8, which allows communication of metered fluid from the nozzles 6 to an actuator (not shown). As is known in the art, the electric motor 4 is used to control deflection of the blocking element 2a and vary the fluid delivered to the actuator from the nozzles 6 as required.

Calibration of the servo valve 1 is achieved by adjusting the axial distance from the nozzle fluid outlet 6a to the flapper 2, by pulling or pushing the nozzles 6 axially (left or right in FIG. 1) within the nozzle housing 8, parallel to the central longitudinal axis C-C of the nozzle cavity.

With reference to FIG. 2, a prior art servo valve 1 is illustrated, which is similar to that shown in FIG. 1, but which further comprises contaminant filters 9 positioned over fluid ports 8a and 8b. Servo valve 1 also further comprises caps 10 that seal nozzle cavities 12 from the environment (i.e. after calibration). To this end, caps 10 feature a recess 10a and O-ring 10b within the recess that provides a seal between the cap 10 and the nozzle housing 8.

With reference to FIG. 3a, a nozzle assembly 20 of a servo valve, in accordance with the disclosure, is illustrated. Nozzle assembly 20 comprises a nozzle housing 28 having a nozzle cavity 21 therein, a flapper 22 with a blocking element 22a, and axially aligned, opposed nozzles 26 received in the nozzle cavity 21. The nozzles 26 comprise nozzle outlets 26a, inlets 26b, and an inner threaded portion 26c, for example, at the inlet end of the nozzle 26. Nozzles 26 are secured in the nozzle cavity 21 and calibrated relative to the central longitudinal axis C-C of the nozzle cavity 21 in the same manner as described in relation to FIGS. 1 and 2 above, by engaging a threaded calibration rod with the threaded portion 26c of the nozzle 26 and moving the nozzle 26 by pushing or pulling on the calibration rod. The housing 28 also has a pair of ports 28a, which allow communication of fluid to the nozzles 26, and a fluid port 28b, which allows communication of metered fluid from the nozzles 26 to an actuator downstream (not shown).

With reference to FIGS. 3a, 4, 5a and 5b, a tubular filter 40 is received in the nozzle cavity 21. As will be appreciated by one skilled in the art, "tubular" is not limited to a tube of circular cross-section (i.e. cylindrical tube), but also includes a tube of any suitable cross-section, for instance, a square/rectangle cross-section tube or an oval cross-section tube.

In this embodiment, the tubular filter 40 comprises a nozzle fitting adapter 14 and a tubular filter body 15. Nozzle fitting adapter 14 comprises radially inner and outer cylindrical portions 14a, 14c. The radially inner cylindrical portion 14a comprises a threaded portion 14a' on its external surface 14a", a filter body fitting region 14b, and an outlet 14e. The radially outer cylindrical portion 14c comprises an outer collar portion 14c' and opposed slots 14d formed in the end surface of the collar portion 14c'. The radially inner and outer cylindrical portions 14a, 14c are joined via a shoulder portion 14f. In this embodiment, the adapter 14 is formed as a unitary, monolithic component.

In this embodiment, the tubular filter body 15 comprises a mesh 15a (i.e. perforated surface), a first end 15b, and an opposing second end 15c. The tubular filter 40 is assembled (as shown in FIG. 4) by receiving the first end 15b into the body fitting region 14b and fixing them together to form joint 15d by one or more of interference fitting, welding, or brazing, for example. To improve the attachment of the filter body 15 to the nozzle 26, the first end 15b of the filter body 15 is non-perforated, i.e. has a circumferentially solid wall 15b'. The first end 15b may, as shown, project beyond the shoulder portion 14f of the adapter 14, into a portion of the body fitting region 14b which has a larger inner diameter than the radially inner cylindrical portion 14a.

Tubular filter 40 is threadably attached to the nozzle 26, at the nozzle inlet 26b, by threaded engagement between the threaded portion 14a' of the nozzle fitting adapter 14 and the inner threaded portion 26c of the nozzle 26, which are complementarily threaded.

The plurality of slots 14d in the collar portion 14c of the nozzle fitting adapter 14 are configured to receive a torque tool, which can be used to aid threaded insertion and removal of the tubular filter 40 from the nozzles 26.

As shown in FIG. 3b, the mesh 15a is configured to block (i.e. filter out) contaminant particles CON from entering the tubular filter 40 and thus passing through to the nozzles 26. In this manner, mesh 15a comprises openings of a size appropriate to block contaminant particles CON of a certain maximum size. As will be appreciated by the skilled person, this size is known as the "absolute filtration" of the mesh 15a. In a particular embodiment, mesh 15a comprises an absolute filtration of about 0.1 mm, however, any suitable absolute filtration/opening size can be used within the scope of this disclosure.

In certain applications, the nozzle assembly will be subject to high fluid pressures and/or temperatures. In these applications, mesh 15a is to be made of a relatively durable/corrosion resistance material, for instance, in certain embodiments mesh 15a may be made of a 300 series stainless steel.

A spring member 17 is placed into the nozzle cavity 21, around the filter body 15 and placed into an abutting relationship with the axially facing internal wall 14g of nozzle fitting adapter 14. As shown in FIGS. 3a, 3b, 5a and 5b, the spring member 17 is surrounded by the collar portion 14c', which may help support placement of the spring member 17. In alternative embodiments, however, a collar portion 14c may not be necessary, and the spring member 17 can rest directly against the nozzle housing 28 in the cavity 21.

A cap 30 is used to seal the nozzle cavity 21 from the environment. Cap 30 comprises a seal recess 30a holding O-ring 30b, attachment wings 30c, fastener apertures 30d and a filter body receiving recess 32. Cap 30 is placed into the nozzle cavity 21 and secured to the nozzle housing 28 using removable fasteners (not shown) which pass through the apertures 30d in the attachment wings 30c.

The second end 15c of the filter body 15 is received and supported by the filter body receiving recess 32. To provide improved connection, the second end 14c may also be solid (as shown), as opposed to perforated, although this is not essential. Having a solid end wall at second end 15c may also avoid the possibility of contaminants entering the filter 40 or filter body 15 through the second end 15c.

In this manner, the filter body 15 is supported at both its ends 15b, 15c, which provides a more robust connection and improves the vibration characteristics of the tubular filter 40. In addition, the cap 30 abuts and compresses the spring member 17 between the nozzle fitting adapter 14 and the cap 30. The spring compression exerts a spring force on the nozzle fitting adapter 14, which opposes rotation of the nozzle fitting adapter 14. The seal recess 30a and O-ring 30b provide a seal between the nozzle housing 28 and the cap 30, to prevent fluid exiting the housing 28.

As shown in FIG. 3b, providing a tubular filter body 15 immediately upstream of the nozzles 26 in a servo valve can provide a mesh 15a with a relatively large filter flow area (i.e. compared to the filters 9 shown in the example of FIG. 2). This can allow substantial accumulation of contaminant particles CON on the mesh 15a, without causing a blockage, which may increase the operation time between tubular filter 40 replacements. The nozzle-based location of the filter body 15 also shortens the distance between the mesh 15a and the nozzle outlet 26a compared to other prior art servo valve filter designs (such as shown in FIG. 2). This gives less chance of contaminant particles being picked up downstream of the filter body 15 and being transferred to the nozzle outlet 26a.

The tubular filter 40 and its threaded attachment to the nozzle 26, via nozzle fitting adapter 14, provides a convenient modular filter solution that can be easily replaced. In addition, the filter can be fitted at the same time as nozzle calibration, which reduces overall servo valve assembly maintenance times.

Although the depicted embodiments include a tubular filter 40 comprising a tubular filter body 15 and a nozzle fitting adapter 14, in alternative embodiments within the scope of this disclosure, the tubular filter body 15 may be connected to the nozzle directly, without the need for a nozzle fitting adapter 14. In one of these alternative embodiments, the first end 15b may have a threaded portion that co-operates with the thread portion 26c of the nozzle 26 to provide connection to the nozzle 26. Also, in these alternative and other embodiments, it may be possible to dispense with supporting the second end 15c of the filter body 15 in the cap 30.

The invention claimed is:

1. A nozzle assembly for a servo valve comprising:
   a nozzle including a nozzle inlet and a nozzle outlet; and
   a tubular filter mounted to the nozzle configured to filter fluid flowing into the nozzle through the nozzle inlet, wherein the tubular filter includes:
      a tubular filter body; and
      a nozzle fitting adapter;
      wherein a first end of the filter body is fixed to the nozzle fitting adapter and a portion of the nozzle fitting adapter is received by a portion of the nozzle at the nozzle inlet; and
      wherein the portions of the nozzle fitting adapter and the nozzle inlet are complementary threaded portions.

2. The nozzle assembly of claim 1, wherein the nozzle fitting adapter comprises a plurality of slots therein configured to receive a torque tool.

3. The nozzle assembly of claim 1, wherein the first end of the filter body is fixed to the nozzle fitting adapter by one or more of an interference fit, weld or braze.

4. The nozzle assembly of claim 1, wherein the tubular filter comprises a mesh configured to provide an absolute filtration of around 0.1 mm.

5. A nozzle assembly for a servo valve comprising:
   a nozzle including a nozzle inlet and a nozzle outlet; and
   a tubular filter mounted to the nozzle configured to filter fluid flowing into the nozzle through the nozzle inlet, wherein the tubular filter includes:
      a tubular filter body; and
      a nozzle fitting adapter;
      wherein a first end of the filter body is fixed to the nozzle fitting adapter and a portion of the nozzle fitting adapter is received by a portion of the nozzle at the nozzle inlet;
   wherein the nozzle assembly further comprises:
   a housing including a nozzle cavity, the nozzle being received in the nozzle cavity; and
   a cap receiving a second, opposing end of the filter body, and providing a removable seal between the environment and the nozzle cavity.

6. The nozzle assembly of claim 5, wherein the cap further comprises an annular recess and an O-ring received in the recess.

7. The nozzle assembly of claim 5, wherein the cap is secured to the housing with removable fasteners or via a screw thread on an outer surface of the cap co-operating with a screw thread on the housing.

8. The nozzle assembly of claim 5, wherein the nozzle assembly further comprises a spring member extending between the cap and the nozzle fitting adapter, the spring member surrounding the filter body and allowing fluid communication thereto.

9. The nozzle assembly of claim 5, further comprising:
   a control fluid port opening into the nozzle cavity and in fluid communication with the nozzle via the tubular filter;
   a flapper arm mounted opposite to the nozzle outlet;
   an electric motor configured to control the distance between the flapper arm relative to the nozzle outlet.

10. A method of assembling a servo valve assembly comprising:
   providing a housing including a nozzle cavity having a central longitudinal axis (C);
   placing a nozzle having a nozzle inlet and a nozzle outlet in the nozzle cavity;
   calibrating the nozzle by moving the nozzle in a direction parallel to the longitudinal axis (C);
   mounting a tubular filter to the nozzle configured to filter fluid flowing into the nozzle through the nozzle inlet;
   wherein the tubular filter comprises:
      a tubular filter body; and
      a nozzle fitting adapter, wherein a first end of the filter body is fixed to the nozzle fitting adapter;
   wherein the step of mounting the tubular filter to the nozzle further comprises mounting a portion of the nozzle fitting adapter to a portion of the nozzle at the nozzle inlet;
   wherein the portion of the nozzle fitting adapter is threaded; and
   wherein the step of mounting the tubular filter to the nozzle further comprises threadably engaging the threaded portion of the nozzle fitting adapter to the nozzle at the nozzle inlet.

* * * * *